US008875232B2

United States Patent
Blom et al.

(10) Patent No.: US 8,875,232 B2
(45) Date of Patent: Oct. 28, 2014

(54) USER AUTHENTICATION

(75) Inventors: Rolf Blom, Jarfalla (SE); Luis Barriga, Bandhagen (SE); Karl Norrman, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 228 days.

(21) Appl. No.: 13/201,694

(22) PCT Filed: Feb. 18, 2009

(86) PCT No.: PCT/SE2009/050182
§ 371 (c)(1),
(2), (4) Date: Aug. 16, 2011

(87) PCT Pub. No.: WO2010/095988
PCT Pub. Date: Aug. 26, 2010

(65) Prior Publication Data
US 2011/0302627 A1    Dec. 8, 2011

(51) Int. Cl.
*H04L 29/06*    (2006.01)
*H04W 12/06*    (2009.01)
*H04L 29/08*    (2006.01)

(52) U.S. Cl.
CPC ............. *H04W 12/06* (2013.01); *H04L 67/04* (2013.01); *H04L 63/18* (2013.01); *H04L 63/0492* (2013.01)
USPC ............... 726/2; 713/150; 713/168; 713/182; 713/185

(58) Field of Classification Search
CPC ............ H04L 29/08108; H04L 63/0492; H04L 63/18; H04L 67/04; H04W 12/06
USPC ............................................................. 726/2
See application file for complete search history.

(56) References Cited

U.S. PATENT DOCUMENTS 7,627,341 B2 * 12/2009 Wu .......................... 455/556.1
2004/0128509 A1 * 7/2004 Gehrmann .................. 713/171
(Continued)

FOREIGN PATENT DOCUMENTS

EP    1758053 A1    2/2007
KR    20040089279 A    10/2004
(Continued)

OTHER PUBLICATIONS

Remedios et al., NFC Technologies in Mobile Phones and Emerging Applications, Jan. 2006, Springer IFIP, vol. 220, pp. 425-434.*

*Primary Examiner* — Jason Lee
*Assistant Examiner* — Kenneth Chang
(74) *Attorney, Agent, or Firm* — Rothwell, Figg, Ernst & Manbeck, P.C.

(57) ABSTRACT

A method of authenticating access to a service comprises: a) receiving at a mobile terminal, over a bi-directional near-field communication channel between the mobile terminal and a browser, at least part of the identifier of a service; b) comparing, at the mobile terminal, at least part of the identifier received at the mobile terminal with a set of identifiers stored in the mobile device; and c) authenticating access to the service on the basis of whether at least part of the identifier received at the mobile terminal matches an identifier in the set. The mobile terminal may stored a set of URLs, and may compare a received URL (or part URL) with the set of stored URLs. It may generate an alert to the user if at least part of the URL received at the mobile terminal does not match a stored URL. User names and keys are not required to be stored on the web-browser, so the web-browser does not need to maintain a password database. This improves security, since a password database would be vulnerable to malicious code.

21 Claims, 4 Drawing Sheets

(56) References Cited

U.S. PATENT DOCUMENTS

| | | | |
|---|---|---|---|
| 2004/0147246 A1* | 7/2004 | Kim | 455/411 |
| 2004/0255119 A1* | 12/2004 | Ukeda et al. | 713/169 |
| 2005/0076198 A1* | 4/2005 | Skomra et al. | 713/156 |
| 2006/0104234 A1* | 5/2006 | Zhang | 370/328 |
| 2006/0178110 A1* | 8/2006 | Nurminen et al. | 455/41.2 |
| 2006/0253597 A1* | 11/2006 | Mujica | 709/229 |
| 2007/0022058 A1 | 1/2007 | Labrou et al. | |
| 2008/0289030 A1* | 11/2008 | Poplett | 726/15 |
| 2009/0018964 A1 | 1/2009 | Liu et al. | |
| 2009/0047964 A1* | 2/2009 | Krishnaswamy | 455/438 |
| 2009/0172402 A1* | 7/2009 | Tran | 713/170 |
| 2009/0227226 A1* | 9/2009 | Gupta et al. | 455/405 |
| 2009/0249457 A1* | 10/2009 | Graff et al. | 726/6 |
| 2010/0274859 A1* | 10/2010 | Bucuk | 709/206 |

FOREIGN PATENT DOCUMENTS

| | | |
|---|---|---|
| KR | 100858871 B1 | 9/2008 |
| WO | 2008042302 A2 | 4/2008 |

* cited by examiner

USER AUTHENTICATION

CROSS-REFERENCE TO RELATED APPLICATION

This application is a 35 U.S.C.§371 National Phase Entry Application from PCT/SE2009/050182, filed Feb. 18, 2009, and designating the United States.

FIELD OF THE INVENTION

The present invention relates to secure access to a service from a client, comprising filtering of service identifier and generation of a key to allow for secure communication between the server and the client.

BACKGROUND TO THE INVENTION

Many web-sites require that a user provides evidence of their identity before they can access the web-site. This process is generally referred to as "user authentication", and typically requires that a user enter a username and a key that (supposedly) is known only to the user and to the administrator of the web-site. The key may be a static key that is valid indefinitely or it may be a one-time key that can be used only once. A key may be, for example a password or passphrase, or a personal identification number (PIN) and, in general terms, may be any string of letters, numerals and/or other characters such as spaces and punctuation marks.

User authentication when logging in to web-pages and applications on the web is cumbersome, particularly if a user wishes to log-in to a number of different web-pages and/or applications. The user has to check the URL or other non-comprehensive security indicators of the web-page being accessed to make sure that he sends his username and password to the intended server/application. The transmission to the server is usually protected by TLS (transport layer security).

If one time passwords are used, they may exhibit the nice feature that the user has to enter a PIN to generate a password. This is good as the authentication cannot take place without explicit user interaction. There are however several known problems with this solution.

The user may have to remember many different usernames and passwords to ensure security separation between services. This can be difficult. It is known for a user to use the same password for more than one service to reduce the number of keys that they have to remember, but this may lead to a loss of security.

Often users can be fooled to submit their username and password to a server emulating the service or when connecting to a "phishing" site. This is in particular a problem, since manual verification of URLs or security indicators such as certificate owners is very difficult for most users, and it is difficult even for a knowledgeable user if, e.g., internationalized domain names are used.

Desktop browsers and mobile browsers implement today a so-called "password management" function that detects sites requesting authentication and store the user-provided username and password with the corresponding URL, to avoid the user having to remember all their passwords and usernames. However, the stored information can only be used for the browser itself, and it can't be used across other external browsers. In addition, the password manager keeps the passwords stored on the device, and if any malicious code should invade the device it may be able to get access to the password database and thereby lead to loss of security.

The GBA process is a key generation/distribution function that is standardised in 3GPP and 3GPP2. The main application is to provide keys that can be used for user authentication and set-up of protected connections between a mobile telephone and a service in the operator network.

The triggering of the key generation is controlled by the mobile telephone, and the server can only obtain a key after being contacted by the mobile telephone.

For completeness, a brief description of GBA will be included herein. This is taken from the 3GPP specification 3GPP TS 33.220.

FIG. 4 shows a simple network model of the entities involved in the bootstrapping approach, and the reference points used between them.

A generic bootstrapping server function (BSF) 7 and the user equipment (UE) 8 mutually authenticate using the AKA protocol, and agree on session keys that are afterwards applied between the UE 8 and a network application function (NAF) 9. The BSF 7 shall restrict the applicability of the key material to a specific NAF by using a well-defined key derivation procedure, which includes among other entities the "name" of the NAF 9. The key derivation procedure may be used with multiple NAFs during the lifetime of the key material. The lifetime of the key material is set according to the local policy of the BSF 7.

The basis of the key generation is the UMTS AKA mechanism which, from a RAND with the help of user unique functions, derives two keys, Ck and Ik. The concatenation of these keys into a 256 bit entity is denominated Ks.

The BSF 7 retrieves an authentication vector from the HSS 10 and generates the key material Ks by concatenating Ck and Ik. A key identifier B-TID is generated in the format of a NAI by taking the base64 encoded RAND value and the BSF server name, i.e. as base64encode(RAND)@BSF_servers_domain_name.

The UE 8 authenticates itself towards the BSF 7b according to the http digest AKA specification (RFC 3310). In this protocol the BSF 7 sends a RAND and the corresponding AUTN to the UE 8. The UE 8 responds with a digest based on the RES from the AKA procedure. At the same time the Ck and Ik keys are generated.

The BSF 7 shall be able to acquire the GBA user security settings (GUSS) from the HSS 10.

After the bootstrapping has been completed, the UE 8 and a NAF 9 can run an application specific protocol where the authentication of messages will be based on those session keys generated during the mutual authentication between the UE 8 and the BSF 7.

General assumptions for the functionality of a NAF are:
there is no previous security association between the UE 8 and the NAF 9;
the NAF shall be able to locate and communicate securely with the subscriber's BSF;
the NAF shall be able to acquire a shared key material established between UE and the BSF during the run of the application-specific protocol;
the NAF shall be able to acquire zero or more application-specific USSs from the HSS via the BSF;
the NAF shall be able to set the local validity condition of the shared key material according to the local policy;
the NAF shall be able to check lifetime and local validity condition of the shared key material.

SUMMARY OF THE INVENTION

A first aspect of the present invention provides a method of authenticating access to a service. The method comprises receiving at a mobile terminal, over a bi-directional near-field communication channel between the mobile terminal and a browser, at least part of the identifier of a service. At least part of the identifier received at the mobile terminal is compared with a set of identifiers stored in the mobile device. Access to the service is authenticated on the basis of whether the at least part of the identifier received at the mobile terminal matches an identifier in the set. (The match may be an exact match or a partial match.)

Access to the service may be authenticated if the at least part of the identifier received at the mobile terminal matches an identifier in the set. For example, the set may be a set of service identifiers of that are known to be genuine.

Alternatively, access to the service may not be authenticated if the at least part of the identifier received at the mobile terminal matches an identifier in the set. In this example, the set may be a set of "forbidden" service identifiers, for example service identifiers that are know to be fake (eg known to be "phishing" sites) or that relate to undesirable content.

The method may further comprise, if the at least part of the identifier received at the mobile terminal matches an identifier in the set, generating a key for authenticating access to the service.

The term "key" as used herein is intend to include a password or passphrase, or a personal identification number (PIN) and, in general terms, may be any string of letters, numerals and/or other characters such as spaces and punctuation marks.

The method may further comprise providing the browser and a server hosting the service with the key or with information from which they may obtain the key.

The method may also comprise establishing secure communication between the browser and the server hosting the service using the key. It may comprise establishing secure communication using a pre-shared key protocol.

The method may further comprise generating, at the mobile terminal, a visual, audible or tactile indication if the at least part of the identifier received at the mobile terminal matches an identifier in the set.

The method may further comprise obtaining the user's consent before generating the key for accessing the service.

The mobile terminal may generate a one-time key.

Obtaining the key may comprise: obtaining a first key shared with a network entity; and generating, at the mobile terminal, a second key from the first key.

The method may further comprise transmitting the second key to the browser.

Generating the second key may further comprise generating, at the mobile terminal, a key reference associated with the second key.

The method may comprise transmitting the key reference to the server hosting the service.

13. A method as claimed in claim 12, and comprising the server hosting the service transmitting the key reference to the network entity and receiving in response the second key from the network entity.

The method may further comprise establishing the bi-directional near-field communication channel between the browser and the mobile terminal in response to receipt of the service identifier from the server.

The method may further comprise, if the at least part of the identifier received at the mobile terminal matches an identifier in the set, informing the user of the identity of the service.

Authenticating access to the service may comprise, if the at least part of the identifier received at the mobile terminal does not match an identifier in the set, generating an alert.

A server hosting the service may identify to the browser at least one of (1) an authentication method to be used and (2) authentication methods available for use.

The method may further comprise informing the mobile terminal of at least one of (1) an authentication method to be used and (2) authentication methods available for use.

A second aspect of the invention provides a mobile terminal, comprising a receiver for receiving, over a bi-directional near-field communication channel between the mobile terminal and a web-browser, at least part of the identifier of a service; and a comparator for comparing the at least part of the identifier received at the mobile terminal with a set of identifiers stored in the mobile device. The mobile terminal is adapted to authenticate access to the service on the basis of whether the at least part of the identifier received at the mobile terminal matches an identifier in the set.

BRIEF DESCRIPTION OF THE DRAWINGS

The present invention will be described by way of illustrative example with reference to the accompanying drawings in which.

DETAILED DESCRIPTION OF PREFERRED EMBODIMENTS

The general concept of the present invention is to use a mobile terminal, such as a mobile telephone, as a security token. The invention will be described with reference to a user using a client attempting to communicate with a server offering a service, but the invention is in principle not limited to this scenario but applies to general client server based applications.

Figure 4:
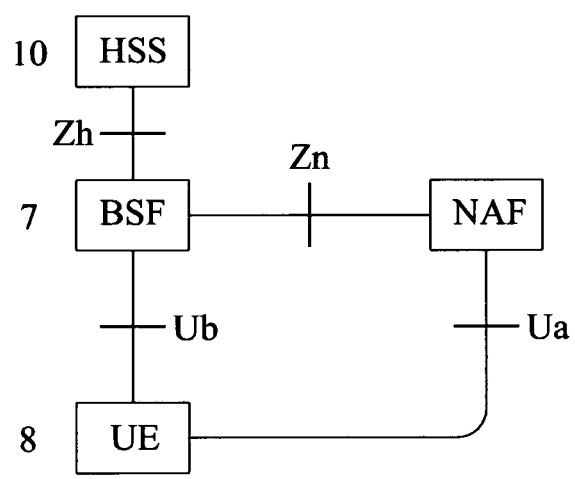
FIG. 4 illustrates key generation according to the general bootstrap approach (GBA).

In order to implement the invention, a user requires a computer terminal such as a desktop or laptop computer that is equipped with a near field communication (NFC) device and a browser. It is assumed that the user is attempting to communicate with a server, and that the server is capable of implementing a back-end interface towards an user authentication system e.g. a GBA BSF, AAA server, or OTP-server It is further assumed that the user has a mobile telephone (or other mobile device) that is equipped with a NFC device that allows communication with the NFC device of the user's computer terminal. Furthermore, the user's mobile terminal is capable of key establishment, for example using GBA, OTP or a challenge response method. (The GBA (generic bootstrapping) method of key establishment is described with reference to FIG. 4 of the present application, for completeness.)

It is further assumed that the user has pre-stored in their mobile telephone a table in which each row has space for a tuple of the form:

<service-alias, service identifier, [authentication method], [user ID], [Keying-ID], [key], [key lifetime], [usage policies] [other optional parameters]>, where:

"service-alias" is a user-defined name for a particular service;

"service identifier" is an identifier holding e.g. the complete or parts of the address of a (secure) service. The service identifier holds the same type of information as a password manager in a web browser holds to enable it to recognize specific web sites and link them to associated username-password pairs (in a case where multiple services are hosted by the same domain and the rest of the parameters in the tuple are the same for all services in that domain, the identifier may contain only the domain part which is the same for all the services);

the optional field "authentication method" is a field indicating the authentication method to use if more than one authentication method is supported by the mobile telephone;

the optional field "User ID" is the identity used to log on to that service;

the optional field "Keying-ID" could be an identifier of the users base key Ks in GBA (BTID), or could be the identifier for a base key used in a OTP system;

the optional field "Key" is a container for a PSK-TLS GBA-based NAF secret key (Ks-NAF);

the optional field "key lifetime" gives the expiry time of the Key;

the optional field "usage policies" describes how the telephone should behave when an authentication to a service is initiated—for example, whether any user authorisation (i.e. human interaction) is needed (i.e. if the user has to interact with the mobile telephone) to complete the authentication process; and other optional parameters.

It should be noted that, in an embodiment that uses GBA, Ks and the corresponding NAF-key may be reused during its lifetime and in this case there is a need to include the B-TID in the set. However, if desired it could be a policy that authentication should always start with an unused NAF-key.

It should also be noted that the description of the invention assumes that the user is authorised to access the service. Determination of whether a user is authorised to access the service is a separate matter from the present invention, and will not be described herein.

Figure 1:
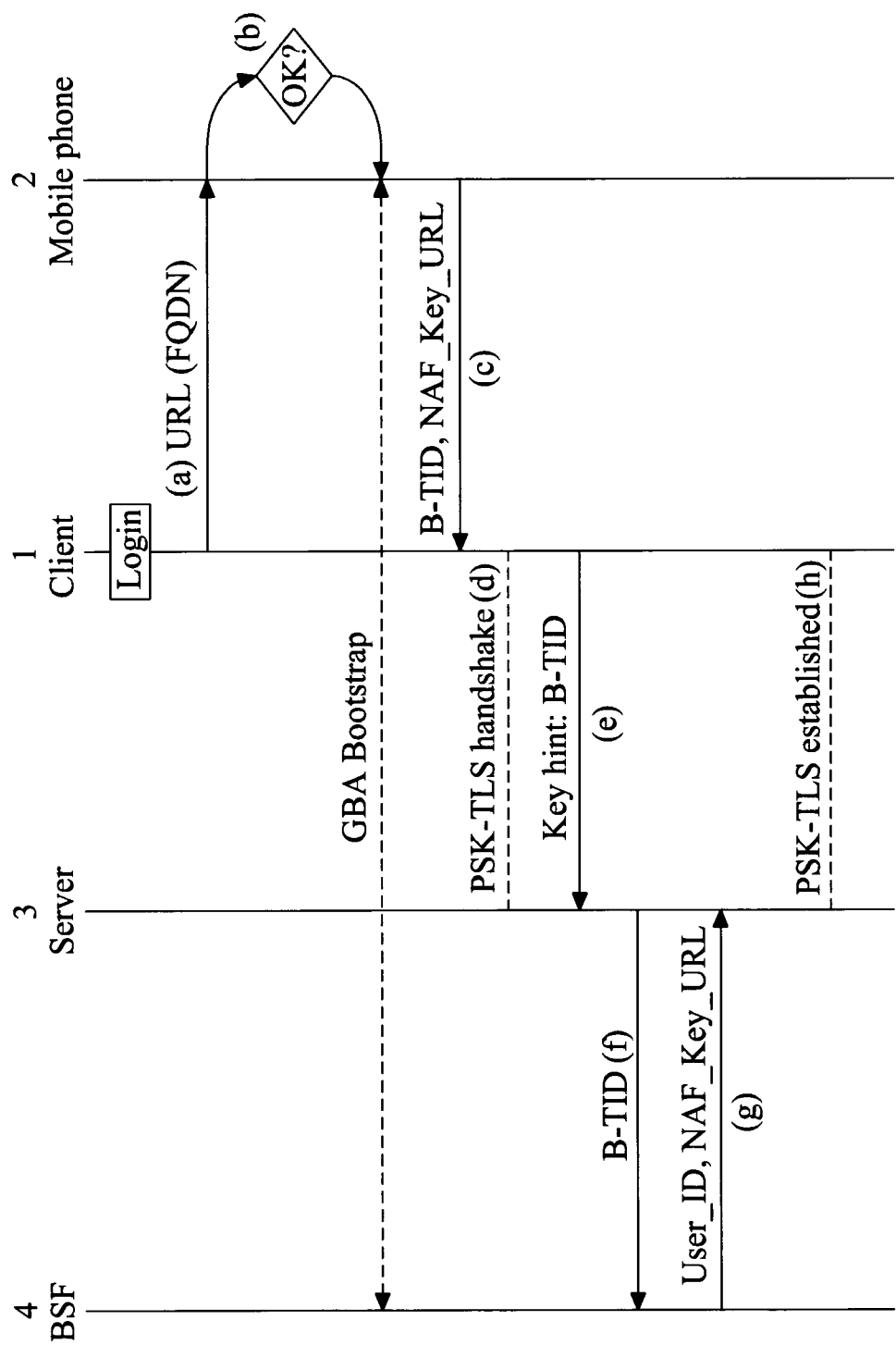
FIG. 1 is a schematic illustration of a first method of the present invention.

FIG. 1 illustrates the principal steps of a method according to a first embodiment, relying on GBA, of the present invention.

Step 1 When the user behind their desktop/laptop computer connects to a server that implements the method of the present invention (and the server may indicate this to a user, for example by showing a certain login banner), the client 1 of the user's computer terminal notices that the server supports the invention (for example by means of a special header page that is returned by the server hosting the service, or by special decorators contained in the address or identifier for the service (e.g. a URL of a web-page)). Another option is that the server displays the different authentication options it supports and the user selects which one to use; as a further option the server may provide the client 1 with an indication of which authentication option(s) it supports. When the client notices this, it activates the near field device of the user's computer terminal, thereby enabling bi-directional communication with the user's mobile telephone 2 or other mobile device. The client may then inform the user that near field communication is enabled and can be used.

As a further option the server indicates in an HTTP-header, not visible to the user, that the authentication service is available. When the browser reads this header it can generate a pop-up window informing the user about it.

Step 2 The user then places their mobile telephone 2 over or in close proximity to the near field communication device of their desktop/laptop computer, to allow communication between the client 1 and the mobile telephone 2 over the near field communication channel.

The near field communication device of the user's desktop/laptop computer may detect the proximity of the mobile telephone in any suitable way (suitable ways include, but are not limited to, optical, mechanical and/or magnetic methods). If the mobile telephone is not active when placed near the near field communication device of the user's desktop/laptop computer, the near field communication device may advantageously, be arranged to "wake-up" the mobile telephone by any suitable means and then establish the near field communication channel.

Step 3 When the user places their mobile telephone 2 over or in close proximity to the NFC device of their desktop/laptop computer, the client 1 senses the presence of the telephone and sends the service identifier, which in this embodiment is in the form of a fully qualified domain name (as required by GBA), of the server on which the requested service is located to the mobile telephone over the near field communication channel. The client may also send the mobile telephone an indication of the authentication method to be used if known at this stage or, if the server supports more than one authentication method, may send an indication of which authentication options the server supports. This is shown as "a" in FIG. 1.

Step 4 When the mobile telephone 2 receives a service identifier from the client 1, it compares it with the service identifiers that the user has pre-stored in the mobile telephone. The comparison process is shown as "b" in FIG. 1. If the received service identifier does not match any of the stored service identifiers, the mobile telephone 2 warns the user of this, as this might indicate that the user is attempting to access a fake service rather than a genuine service. The user may be warned via a mobile telephone and/or by sending a message to the client over the near field communication link for display on the user's computer.

If, on the other hand, the received service identifier is found to match, at least partially, one of the service identifiers pre-stored by the user in the form of elements of the tuples and the usage policies require it, the mobile telephone 2 displays the service-alias contained in that tuple, and possibly also displays the service identifier. This provides the user with confirmation of the service that they are attempting to access. The mobile telephone then preferably requests consent from the user to proceed with the establishment of a key. Requiring user interaction in the process of establishing a key has the advantage of helping to prevent automated attacks, for example in the event that malicious code has taken control of the user's client (or is running in the background in the users mobile phone 2).

Step 5 In a method in which the user is required to give their consent to key establishment, this may be done in any suitable way. For example, the user may be required to depress a particular key on the keypad of their mobile telephone, they may be required to enter a PIN that identifies the user, etc.

Step 6 Once the user has given their consent, the mobile telephone 2 proceeds with the step of key establishment for the requested service. The key establishment comprises the steps of deriving the Ks_NAF key for the requested service. If there is no Ks available in the user's terminal equipment, the key establishment may comprise establishing a key via a GBA bootstrapping process with a bootstrapping server function BSF (this is denoted by a broken line in FIG. 1).

Key establishment and the setting up of a secure communications channel in this embodiment will be described, by way of example, with reference to the PSK-TLS protocol.

The mobile telephone 2 then generates a PSK-TLS NAF-key for the service of the selected server. (A PSK-TLS key denotes a pre-shared key for use with transport layer security.)

This NAF-key is generated from the Ks key, the fully qualified domain name of the server hosting the service and other information as specified by GBA.

Step 7 The mobile telephone 2 sends the NAF-key to the browser 1 over the near field communication path. The keying ID, in form of a B-TID, from the stored tuple relating to the required service identity is also transferred to the client over the NFC. This is shown as "c" in FIG. 1.

If the authentication process in the mobile phone was initiated without an indication of a specific authentication method to be used, the mobile phone has to also inform the client of the authentication method to be used. This information may be transferred for information in other cases.

Step 8 Upon receipt of the key and the keying ID, the client 1 starts the process of setting up secure PSK-TLS communication with the server 3 hosting the service requested by the user. The steps of setting up the secure communication are not shown in full in FIG. 1 but will, in general, consist of one or more introductory messages described generally in FIG. 1 as "PSK-TLS handshake" (shown as "d"), including sending the keying ID to the server 3 (shown as "e") of FIG. 1.

Step 9 When the server 3 has received the keying ID identifier (B-TID), it can transmit this to the bootstrapping server function (BSF) 4 (shown as T). The BSF 4 will respond by sending the user ID and the NAF-key for the selected service identifier to the server 3 (shown as "g"). The server 3 is now able to complete the establishment of secure communication with the client 1 according to a shared key protocol (e.g., PSK-TLS), using the NAF-key as the key for securing the communication between the server and the client. Provided that the process has been correctly completed, the server and the client are both now in possession of the same key, the NAF-key, and so can encipher and integrity protect communications between them using this key (or keys derived from said key).

The establishment of secure PSK communication between the server 3 and the client 1 is shown as " "h in FIG. 1; this may also be referred to as establishing a "PSK-TLS tunnel" between the client and the server.

In the method of FIG. 1, the user identity for logging on to the server, "user ID", can be provided by the BSF to the server. It is therefore not necessary for the "user ID" to be contained in the tuples stored in the mobile telephone 2. Furthermore, the key NAF-key can be retrieved from the stored GBA base key Ks and so need not be stored in the mobile telephone. This requires that the base key, Ks, is stored in the telephone (unless a new Ks is used for every authentication).

In the present invention, the user is not required to remember their logon identity "user ID" for the service (although a user may of course choose to remember their logon identity), as this is stored in the mobile telephone 2 or may be obtained from the BSF 4. User names and keys are not stored on the client, so that the invention does not require that the client maintains a password database that is vulnerable to malicious code. Furthermore, the step of comparing the service identity supplied by the client to the mobile telephone with the service identities stored in the mobile telephone, and alerting the user if the received service identity does not match any of the stored service identities, makes it less likely that a user will be fooled into providing their user name and/or password to a fake service that is emulating a genuine service.

The invention may be applied in many ways other than the embodiment shown in FIG. 1. For example, although the above description refers to the PSK protocol, It will be clear to the man skilled in the art that protecting the communication channel between the mobile telephone and the server can be accomplished by other pre-shared key protocols than PSK-TLS. For example, the pre-shared key (Ks_NAF in case of GBA) can be used to set up an IPsec tunnel at step h. The pre-shared key would in this case be used in IKEv1 or IKEv2 (where IKEv1 and IKEv2 are Internet Key Exchange protocols). If a pre-shared key protocol other than PSK-TLS is used, it may be necessary to ensure key freshness, for example by use of a nonce to prevent replay attacks.

Furthermore use of HTTP digest for authentication is also possible, and this may be with or without a TLS tunnel, although this has the possible disadvantage that there is then no connection between the authentication and the (protected) communication with the server. However, use of HTTP digest may be useful for legacy nodes that do not support a PSK-based secure tunnel.

Figure 2:
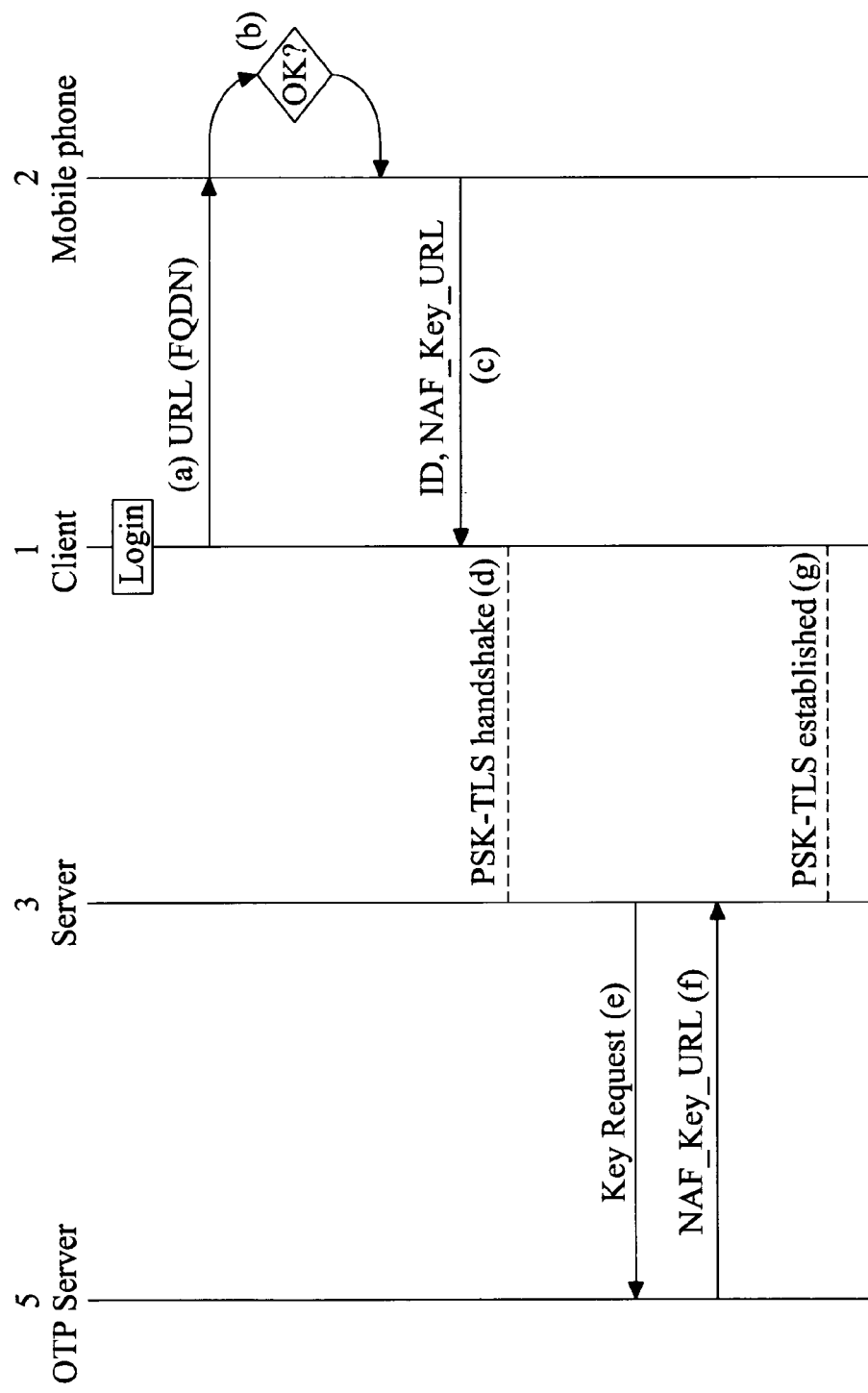
FIG. 2 is a schematic illustration of a second method of the present invention.

Moreover, although the above embodiment uses GBA-based key establishment the invention is not limited to this. FIG. 2 shows a second embodiment of a method according to the present invention in which the mobile telephone generates a one-time password (OTP) rather than using GBA-based key management. Use of a OTP may provide further security, since each key is used only once and so cannot be re-used by a third party.

The method of FIG. 2 proceeds initially according to steps 1-5 of the method of FIG. 1, and further description of these steps will not be repeated.

Step 6a This embodiment of the present invention requires that the mobile telephone 2 has a one-time password generator. Once the user has given their consent to the key generation, the one-time password generator in the mobile telephone 2 generates a base key. Preferably, this base key is then transformed to depend upon the service identity of the requested service in a way similar to how it is done in the GBA based embodiment, for example by performing a hash function of the base key generated by the OTP generator with the service identifier, although the invention may be performed even if this transformation is omitted. The resultant key will be used for pre-shared key secured communication between the server and the client.

Step 7a The key obtained from the key generated by the OTP generator and the service identity is referred to as the key NAF-key, and is transferred from the mobile telephone 2 to the client 1 as step c in FIG. 2. In the method of FIG. 2, the mobile telephone 2 should also provide the client 1 with the user identity (which, in this embodiment, is pre-stored in the mobile telephone together with the table of tuples of authorised service identities.

Step 8a The client 1 then starts the process of setting up a secure communication path with the hosting server 3 that hosts the service requested by the user and, as in FIG. 1, this is shown by the step of "PSK-TLS handshake" (step d). As part of the signalling messages involved in setting up the secure communication path, the client includes the user ID in one of the handshake messages in the PSK-TLS set-up of step d.

Step 9a The server requests the key from a OTP server 5, as step e, and the OTP server 5 provides the key NAF-key to the server 4 as step f. The server and the client are both now in possession of the key NAF-key, and a secure communication channel using a pre-shared key may now be established as indicated at step g. In this embodiment, there might be a need to authenticate the user before the set-up of the PSK-TLS tunnel is completed, and there are several ways in which this may be done. For example, the one-time password generator might generate two entities, one of which is used as a password and one of which is used as a key The server forwards the password to the OTP which then, if the password is verified, can be assured that the user trying to login is an authentic user and isn't a server which tries to obtain keys for a given user or launch a denial of service attack by getting the users OTP generator out of synch with the OTP server. Another possibility would be to forward a cryptographic hash of the key from the client 1 to the server 3 and having the server forward the hash to the OTP server. (This step may also be usefully employed in the method of FIG. 1, to avoid certain denial of service attacks.) Another option is that the server performs the comparison between the password/hash of the key received from the client and from the OTP server. This would allow the server to reject the connection before actually establishing the PSK-TLS connection, but would not allow the OTP server to block delivery of passwords and keys to the server.

Providing a cryptographic hash of the key or a password from the client via the server to the OTP server has the further advantage that it allows synchronization of the one-time password generator in the mobile telephone 2 and the one-time password generator in the OTP server 5. Although these are intended to be synchronised with one another, they might in practice be slightly out of synchronisation with one another. If there is a lack of synchronisation between the two one-time password generators, the OTP server needs to be able to determine which one-time password key the mobile telephone has generated.

If it were desired to minimise the change required to normal web-servers in order to implement the present invention, it would be possible to set-up a TLS tunnel based on server certificates between the web-server and the web-browser, and then run an authentication protocol inside the TLS tunnel to authenticate the user to the server. Typical examples of suitable authentication protocols would be HTTP basic authentication or digest, where the password would be the key obtained above (by performing the hash of the original key and the URL described at step 6a, or it could be based on the OTP base key), or HTTP digest based on the same key. This would avoid the need for the web-server to implement PSK-TLS but would suffer from the drawback that the communications security is independent of the user authentication.

Figure 3:
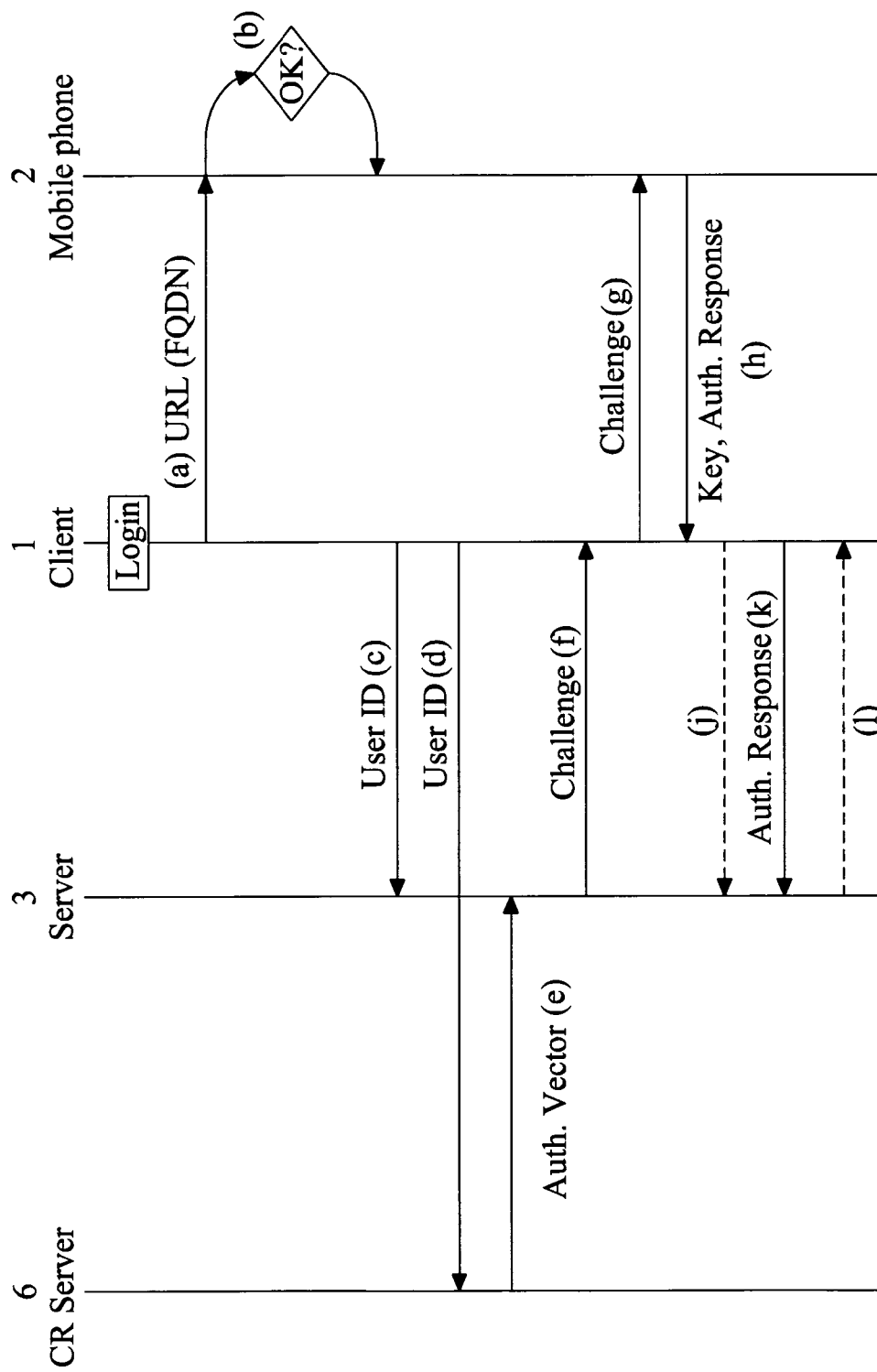
FIG. 3 is a schematic illustration of a third method of the present invention.

FIG. 3 illustrates a method according to a third embodiment of the present invention. This embodiment relates to a challenge response-based method.

The method of FIG. 3 initially proceeds in the manner described above with reference to steps 1 to 4 of the method of FIG. 1, and the description of these steps will therefore not be repeated.

Step 5b The client 1 then sends the user ID to the server 3 hosting the service requested by the user, and requests a challenge for authentication purposes. This is step c of FIG. 3.

Step 6b The client 1 also sends the user ID to a challenge response server (CR server) 6, and requests an authentication vector containing a key that preferably has been transformed to be dependent on the service identity of the requested service, for example using a cryptographic hash function. The authentication vector also contains at least a challenge and an expected response. After the server 3 has received the authentication vector from the CR server 6 (step e), it sends the challenge, possibly together with anti-replay information, to the client 1 (step f).

Step 7b The client 1 then forwards the challenge to the mobile telephone 2 (step g).

Step 8b Upon receipt of the challenge, the mobile telephone 2 calculates a key and an authentication response. The key preferably depends on the service identity of the requested service, and may be generated by performing a hash function of an initially-generated key and the service identity. The key and the authentication response are then sent back to the client 1, as step h.

Step 9b The client 1 then starts setting-up a secure PSK communication path to the server 3, and this is denoted generally as step j in FIG. 3. As part of the set-up signalling, the client 1 forwards the authentication response to the server 3, as step k.

Step 10b The server 3 checks the authentication response received from the client 1 with the corresponding entity received in the authentication vector from the CR server 6 and, if it matches, proceeds with the set-up of the PSK communication path, shown generally as step 1.

In the method of FIG. 3 it is not necessary for the CR server 6 to generate an authentication response and send it to the server 3, as it could be replaced by a hash of the key generated.

In certain implementations it may be possible to piggyback or include some of the messages in the challenge response exchange in/onto the PSK-TLS set-up signalling.

The methods of the present invention may be implemented in any suitable manner. For example, communication between the client 1 and the mobile telephone 2 over the NFC may be carried out by any suitable method. For example, to allow use of the currently available systems, the client may write the information to an active tag, and the mobile telephone would then read that tag.

To obtain the highest level of security in an embodiment where a web browser is used as client 1, the web browser should have an internal trusted function, ie a part of its core functionality, supporting the interactions with the mobile telephone 2 over the NFC channel and performing the set-up of the PSK-TLS tunnel. This means that the browser 1 should hand over the service identifier (e.g. URL) of the (web-) server which requires user authentication to the mentioned internal functionality. This internal function would then perform all communication with the mobile telephone, would perform the PSK-TLS set-up to the web-server 3 serving the URL it received, and when that is done would hand over the "handle" to the secure connection to the "web-page". The "internal functionality" may be part of the browser, but may also be a privileged process run by the OS. In the later case, the web-browser acting as the client 1 would be completely decoupled from the key management. This has several benefits, in that the privileged process may implement a standardized interface and would not be tied to a particular browser brand.

The client and the operating systems of the desktop/laptop preferably does not allow that scripts or similar programs downloaded from the server are executed from or initiated by the browser can perform the functions related to key management and authentication.

When the mobile telephone 2 compares the received service identity with the pre-stored one, it is preferred that it display the web-site alias instead of displaying the service identifier of the requested service, as this may be more convenient for the user. However, the method may provide for the received service identifier to be additionally displayed, or to be displayed upon a request from the user.

Furthermore, the tuple stored in the mobile phone, as described above, may be extended to further contain a user-defined tactile, audible or visual feedback. Thus, the user may associate an icon, a sound or a certain vibration to a given service identity stored in the mobile telephone 2 so that, when the mobile telephone 2 receives that service identity from the web-browser 1, it may display the icon or emit the sound or vibration as well as displaying the alias of the service identifier to indicate that the received service identifier is on the set of "trusted" web-sites pre-stored in the mobile telephone.

In further embodiments of the invention, which are particularly suitable for low entry telephones, the telephone may only indicate to the user that the service identifier is on the trusted set, without handling the subsequent key generation.

Another additional value in each tuple pre-stored in the mobile telephone 2 may be used to indicate whether user consent is required for authentication. This value could be part of the usage policies.

The set of service identifiers for which the system should work could be checked and updated over the Internet, ie when the user enters new service identifiers this service identifier could be checked against a blacklist server on the Internet. This could of course also happen on-line at the time of authentication, be carried out at regular intervals, and/or be carried out by user request. At the same time the user may define a service alias and indicate if user interaction is required or not. Changing the service alias or other equivalent representation of the service identifier in the telephone can of course also be done by the user at a later stage.

In many cases it is not essential that the login user ID identifies the user. On the contrary, it might be preferred that the user ID gives some privacy protection. One way of achieving this would be to use a hash of the user ID used in the underlying authentication system (GBA, one-time password generation system, challenge response system) with the service identifier.

If the user needs more than one user ID for one and the same service, additional parameters can be added as input to the hashing function generating the user name.

For users that have multiple accounts for a given service, the telephone preferably displays all associated user identities, for example in a scroll down window, so the user can choose the desired one for this particular session.

The way that the user identity is generated, and parameters not available from context, has of course to be transferred from the telephone 2 to the server 3.

In the method of FIG. 1, the functionality of the BSF 4 could be extended in such a way that it doesn't return the real user identity but instead returns an identity which is derived with the help of additional parameters like the service identifier (NAF FQDN).

It should be noted that the present invention is not limited to the above embodiments, but may be applied in other ways. For example, the invention may be used to provide one party with control over the services that may be accessed by a second party (for example, to allow a parent to control the services that may be accessed by a child). To do this, the first party would pre-store, in the mobile device of the second party, the set of service identifier of services that may be accessed. When the second party (eg child) attempts to access a service, they would be allowed to access the requested service if the first party (eg parent) had pre-stored the service identifier in the mobile device, and the service would be accessed as described above. If the first party (eg parent) had not pre-stored the service identifier of this service in the second party's mobile device, access to the service would be denied at step 4. Using Ks_int for key generation assures that second party (eg the child) cannot manipulate the set to gain access to pages that are not allowed by the first party.

In the embodiments described above, the mobile telephone contains a pre-stored set of identifiers of services that may be accessed, and a request to access a service is allowed if the service identifier received by the mobile telephone matches (at least partially) one of the identifiers in the pre-stored set. In principle, however, the invention could be alternatively be implemented by the mobile telephone containing a pre-stored set of identifiers of services that may not be accessed with a request to access a service being disallowed if the service identifier received by the mobile telephone matches (at least partially) one of the identifiers in the pre-stored set.

It should be noted that, for the purposes of matching the received service identifier with the set of stored service identifiers, it may not be necessary to send the entire service identifier of the requested service to the mobile telephone 2, and in some cases it may be sufficient to send only a part of the service identifier to the mobile telephone. For example, if certain services hosted by one server are to be treated in the same way, it would be sufficient, for the purposes of matching the received service identifier with the set of stored service identifiers, to send only that part of the service identifier that identifies the group of services. However, the key establishment may require the entire service identifier of the requested service to be provided, depending on the method used to establish the key. For example, if a GBA-based method is used for key establishment, an entire service identifier such as a fully-qualified domain name is required.

The invention claimed is:

1. A method of authenticating access to a service, the method comprising:
   a) receiving, at a first terminal that is in close proximity to a second terminal, at least part of a service identifier that identifies a service provided by a server to which the second terminal seeks access, wherein the at least part of the service identifier is received at the first terminal over a near-field communication (NFC) channel between the first terminal and the second terminal;
   b) determining, at the first terminal, whether the received at least part of the service identifier corresponds to one or more approved services for the second terminal, wherein information indicating whether a service is approved for the second terminal is stored in the first terminal;
   c) if it is determined by the first terminal that the received at least part of the service identifier matches an approved service for the second terminal, displaying on a display of the first terminal: (1) information relating to the at least part of the service identifier, and (2) a request for a user to interact with the first terminal to provide consent to allow or deny the second terminal access to the service;
   d) receiving, at the first terminal, consent from the user to allow or deny the second terminal to access the service;
   e) generating, at the first terminal, a key to authenticate access to the service if the received response from the user indicates that the user consents to allowing the second terminal to access the service;
   f) transmitting the key from the first terminal to the second terminal over the near-field communication (NFC) channel to allow the user to access the service with the second terminal; and
   g) generating, at the first terminal, an audible or tactile indication if the at least part of the service identifier matchers an approved service identifier.

2. The method of claim 1, further comprising:
   providing the second terminal and a server hosting the service with the key or with information from which the key may be obtained.

3. The method of claim 2, further comprising establishing secure communication between the second terminal and the server hosting the service using the key.

4. The method of claim 3, further comprising establishing secure communication between the second terminal and the server hosting the service using a pre-shared key protocol.

5. The method of claim 1, wherein the first terminal generates a one-time key.

6. The method of claim 4, further comprising:
obtaining a first key shared with a network entity; and
generating, at the first terminal, a second key from the first key.

7. The method of claim 6, further comprising transmitting the second key to the second terminal.

8. The method of claim 6, wherein generating the second key further comprises generating, at the first terminal, a key reference associated with the second key.

9. The method of claim 8, further comprising transmitting the key reference to the server hosting the service.

10. The method of claim 9, further comprising the server hosting the service transmitting the key reference to the network entity and receiving in response the second key from the network entity.

11. The method of claim 1, further comprising establishing a bi-directional near-field communication channel between the first device and the second device in response to receipt of the service identifier from a server.

12. The method of claim 1, wherein the information relating to the at least part of the service identifier is an identity of the service.

13. The method of claim 1, wherein if it is determined by the first terminal that the received at least part of the service identifier does not match an approved service for the second terminal, generating an alert.

14. The method of claim 1, wherein a server hosting the service identifies to the second terminal at least one of (1) an authentication method to be used and (2) authentication methods available for use.

15. The method of claim 1, further comprising informing the first terminal of at least one of (1) an authentication method to be used and (2) authentication methods available for use.

16. A first terminal for authenticating access to a service for a second terminal when the second terminal is in close proximity to the first terminal, the first terminal comprising:
a processor configured to:
receive at least part of a service identifier that identifies a service provided by a server to which the second terminal seeks access, wherein the at least part of the service identifier is received at the first terminal over a near-field communication (NFC) channel between the first terminal and the second terminal;
determine whether the received at least part of the service identifier corresponds to one or more approved services for the second terminal, wherein information indicating whether a service is approved for the second terminal is stored in the first terminal;
receive consent via a user interacting with the first terminal to allow or deny the second terminal to access the service;
generate a key to authenticate access to the service if the received response from the user indicates that the user consents to allowing the second terminal to access the service;
transmit the key from the first terminal to the second terminal over the near-field communication (NFC) channel to allow the user to access the service with the second terminal; and
generate an audible or tactile indication if the first terminal determines that the received at least part of the service identifier corresponds to one or more approved services for the second terminal; and
a display for displaying: (1) information relating to the at least part of the service identifier, and (2) a request for the user to interact with the first terminal to provide consent to allow or deny the second terminal access to the service.

17. The first terminal of claim 16, wherein the first terminal is configured to provide the second terminal and a server hosting the service with the key or with information from which they may obtain the key.

18. The first terminal of claim 16, wherein the first terminal is configured to generate a one-time key.

19. The mobile terminal of claim 16, wherein the mobile terminal is configured to establish a bi-directional near-field communication channel between the first device and the second device in response to receipt of the service identifier from a server.

20. The first terminal of claim 16, wherein the first terminal is configured to inform the user of the identity of the service if it is determined by the first terminal that the received at least part of the service identifier corresponds to an approved service for the second terminal.

21. The mobile terminal of claim 16, wherein the processor is configured to generate an alert if it is determined by the first terminal that the received at least part of the service identifier does not match an approved service for the second terminal.

* * * * *